(12) United States Patent
Tannhäuser

(10) Patent No.: US 12,322,951 B2
(45) Date of Patent: Jun. 3, 2025

(54) CIRCUIT BREAKER DEVICE AND METHOD

(71) Applicant: Siemens Aktiengesellschaft, Munich (DE)

(72) Inventor: Marvin Tannhäuser, Hausen (DE)

(73) Assignee: Siemens Aktiengesellschaft, Munich (DE)

( * ) Notice: Subject to any disclaimer, the term of this patent is extended or adjusted under 35 U.S.C. 154(b) by 420 days.

(21) Appl. No.: 17/911,750

(22) PCT Filed: Dec. 17, 2021

(86) PCT No.: PCT/EP2021/086360
§ 371 (c)(1),
(2) Date: Sep. 15, 2022

(87) PCT Pub. No.: WO2022/136136
PCT Pub. Date: Jun. 30, 2022

(65) Prior Publication Data
US 2023/0198241 A1    Jun. 22, 2023

(30) Foreign Application Priority Data
Dec. 21, 2020   (DE) .................. 10 2020 216 409.6

(51) Int. Cl.
*H02H 3/08* (2006.01)
*H02H 3/02* (2006.01)

(52) U.S. Cl.
CPC .............. *H02H 3/08* (2013.01); *H02H 3/021* (2013.01)

(58) Field of Classification Search
CPC ............ H02H 3/08; H02H 3/021; H01H 9/16; H01H 9/548; H01H 9/547
(Continued)

(56) References Cited

U.S. PATENT DOCUMENTS 8,742,828 B2   6/2014  Naumann et al.
2016/0322184 A1  11/2016  Schmitz et al.
(Continued)

FOREIGN PATENT DOCUMENTS

AT         519847 A1    10/2018
CN       101533727 A     9/2009
(Continued)

OTHER PUBLICATIONS

Transcription of Video "Motus<IDC14 Launch Event", from minute 2:47 to minute 5:21; live and to be downloaded from Nov. 24, 2020 from https://www.motus-c14.de/de/event [Original transcription in German, machine translation into English].
(Continued)

*Primary Examiner* — Dharti H Patel
(74) *Attorney, Agent, or Firm* — Laurence A. Greenberg; Werner H. Stemer; Ralph E. Locher

(57) ABSTRACT

A circuit breaker has line-side terminals and load-side terminals for conductors of a low-voltage circuit. A mechanical break contact system is connected to the line-side terminals for indirect-coupling of the low-voltage circuit, and the other end of the break contact system is connected to an electronic interruption unit which has, by use of semiconductor-based switching elements, a high-impedance state of the switching elements to prevent current from flowing and a low-impedance state of the switching elements to allow current to flow in the low-voltage circuit. The electronic interruption unit is connected to the load-side terminals at the other end. The mechanical break contact system can be manually actuated such that contacts of the mechanical break contact system can be manually closed to allow current to flow and be manually opened to interrupt the flow of current in the low-voltage circuit.

20 Claims, 7 Drawing Sheets

(58) Field of Classification Search
 USPC .......................................................... 361/101
 See application file for complete search history.

(56) References Cited

U.S. PATENT DOCUMENTS

| | | | |
|---|---|---|---|
| 2017/0256934 A1 | 9/2017 | Kennedy et al. | |
| 2019/0131966 A1 | 5/2019 | Schmitz et al. | |
| 2019/0341769 A1 | 11/2019 | Askan | |
| 2019/0348238 A1 | 11/2019 | Johansson et al. | |
| 2020/0365346 A1 | 11/2020 | Telefus et al. | |
| 2020/0365347 A1 | 11/2020 | Meissner et al. | |
| 2021/0296059 A1 | 9/2021 | Hussmann | |
| 2022/0149610 A1* | 5/2022 | Beckert | H03K 17/567 |
| 2024/0275162 A1* | 8/2024 | Döbler | H02H 3/093 |
| 2024/0395476 A1* | 11/2024 | Tannhäuser | H01H 83/14 |

FOREIGN PATENT DOCUMENTS

| | | | | |
|---|---|---|---|---|
| CN | 202454464 U | | 9/2012 | |
| CN | 106298297 A | | 1/2017 | |
| CN | 110024069 A | | 7/2019 | |
| DE | 202009014759 U1 | | 2/2010 | |
| DE | 202009004198 U1 | | 8/2010 | |
| DE | 102013114259 A1 | | 6/2015 | |
| DE | 102016106414 A1 | | 10/2017 | |
| DE | 102017101451 A1 | | 7/2018 | |
| DE | 102017127886 A1 | | 5/2019 | |
| DE | 102018213354 A1 | | 2/2020 | |
| JP | 2009087668 A | | 4/2009 | |
| WO | WO-2014075743 A1 | * | 5/2014 | ............. H01H 9/542 |
| WO | WO-2014117813 A1 | * | 8/2014 | ............. H01H 9/542 |
| WO | WO-2020030379 A1 | * | 2/2020 | ............... H01H 9/02 |

OTHER PUBLICATIONS

Wikipedia, Lichtbogen, https://de.wikipedia.org/w/index.php?title=Lichtbogen&oldid=227779974, last update Aug. 11, 2022.

* cited by examiner

CIRCUIT BREAKER DEVICE AND METHOD

FIELD AND BACKGROUND OF THE INVENTION

The invention relates to the technical field of a circuit breaker device for a low-voltage circuit having an electronic interruption unit and a method for a circuit breaker device for a low-voltage circuit having an electronic interruption unit.

Low voltage denotes voltages of up to 1000 volts AC or up to 1500 volts DC. Low voltage in particular denotes voltages that are greater than ultra-low voltage, with values of 50 volts AC or 120 volts DC.

Low-voltage circuit or grid or installation denotes circuits with nominal currents or rated currents of up to 125 amperes, more specifically up to 63 amperes. Low-voltage circuit denotes in particular circuits with nominal currents or rated currents of up to 50 amperes, 40 amperes, 32 amperes, 25 amperes, 16 amperes or 10 amperes. Said current values denote in particular nominal, rated and/or deactivation currents, that is to say the maximum current that is normally carried through the circuit or at which the electrical circuit is normally interrupted, for example by a protection device, such as a circuit breaker device, miniature circuit breaker or circuit breaker.

Miniature circuit breakers are overcurrent protection devices that have long been known and that are used in low-voltage circuits in electrical engineering. They protect lines against damage caused by heating resulting from excessively high current and/or a short circuit. A miniature circuit breaker is able to automatically deactivate the circuit in the event of an overload and/or short circuit. A miniature circuit breaker is a fuse element that does not reset automatically.

Circuit breakers, in contrast to miniature circuit breakers, are designed for currents greater than 125 A, in some cases also starting from 63 amperes. Miniature circuit breakers therefore have a simpler and more delicate design. Miniature circuit breakers usually have an attachment possibility for attachment to what is known as a top-hat rail (busbar, DIN rail, TH35).

Miniature circuit breakers have an electromechanical design. In a housing, they have a mechanical switching contact or shunt trip for interrupting (tripping) the electric current. A bimetal protection element or bimetal element is usually used for tripping (interruption) in the event of a persistent overcurrent (overcurrent protection), respectively in the event of a thermal overload (overload protection). An electromagnetic tripping device with a coil is used for the brief tripping in the event of an overcurrent limit value being exceeded or in the event of a short circuit (short circuit protection). One or more arc extinguishing chambers or arc extinguishing devices are provided. Further connection elements for conductors of the electrical circuit to be protected.

Circuit breaker devices having an electronic interruption unit are relatively new developments. They have a semiconductor-based electronic interruption unit. In other words, the flow of electric current through the low-voltage circuit is carried through semiconductor components, respectively semiconductor switches, which interrupt the flow of electric current or are able to be switched to the on state. Circuit breaker devices having an electronic interruption unit often also have a mechanical isolating contact system, in particular having isolator properties in accordance with the relevant standards for low-voltage circuits, wherein the contacts of the mechanical isolating contact system are connected in series with the electronic interruption unit, that is to say the current of the low-voltage circuit to be protected is carried both through the mechanical isolating contact system and through the electronic interruption unit.

Such an isolating contact system usually has an arc extinguishing system by way of which the arc (switching arc) that arises during switching is able to be extinguished or reduced.

SUMMARY OF THE INVENTION

The present invention relates to low-voltage AC circuits having an AC voltage, usually having a time-dependent sinusoidal AC voltage with the frequency f. The temporal dependency of the instantaneous voltage value u(t) of the AC voltage is described by the equation:

$$u(t)=U^*\sin(2\pi^* f^* t)$$

wherein $u(t)$=instantaneous voltage value at the time $t$ $U$=amplitude (maximum value) of the voltage A harmonic AC voltage may be represented by the rotation of a vector the length of which corresponds to the amplitude (U) of the voltage. The instantaneous deflection is in this case the projection of the vector onto a coordinate system. An oscillation period corresponds to one full revolution of the vector and its full angle is $2\pi$ (2pi) or 360°. The angular frequency is the rate of change of the phase angle of this rotating vector. The angular frequency of a harmonic oscillation is always 2n times its frequency, in other words:

$$\omega=2\pi^* f=2\pi/T=\text{angular frequency of the AC voltage}$$

($T$=period duration of the oscillation)

It is often preferable to give the angular frequency ($\omega$) as opposed to the frequency (F) since many formulae in oscillation theory are able to be represented in a more compact manner with the aid of the angular frequency due to the occurrence of trigonometric functions the period of which by definition is $2\pi$:

$$u(t)=U^*\sin(\omega t)$$

In the case of angular frequencies that are not temporally constant, the term instantaneous angular frequency is also used.

In the case of a sinusoidal, in particular temporally constant, AC voltage, the time-dependent value consisting of the angular velocity $\omega$ and the time t corresponds to the time-dependent angle $\varphi(t)$, which is also referred to as phase angle $\varphi(t)$. In other words, the phase angle $\varphi(t)$ periodically passes through the range 0 ... $2\pi$ or 0° ... 360°. In other words, the phase angle periodically adopts a value between 0 and $2\pi$ or 0° and 360° ($\varphi=n^*(0 ... 2\pi)$ or $\varphi=n^*(0° ... 360°)$, due to periodicity; in short: $\varphi=0 ... 2\pi$ or $\varphi=0° ... 360°$).

Instantaneous voltage value u(t) accordingly denotes the instantaneous value of the voltage at the time t, that is to say, in the case of a sinusoidal (periodic) AC voltage, the value of the voltage at the phase angle $\varphi$ ($\varphi=0 ... 2\pi$ or $\varphi=0° ... 360°$, of the respective period).

The object of the present invention is to improve a circuit breaker device of the type mentioned at the outset, in particular to allow (alternative) identification of switching operations of a mechanical isolating contact system. More specifically to allow a reduction in contact erosion caused by the switching arc or a reduction in the time of switching arcs.

This object is achieved by a circuit breaker device having the features of the independent circuit breaker device patent claim, and by a method as claimed in the independent method patent claim.

According to the invention, provision is made for a circuit breaker device for protecting an electrical low-voltage circuit, in particular low-voltage AC circuit, having:
- a housing having line-side and load-side connections for (at least two) conductors of the low-voltage AC circuit,
- a mechanical isolating contact system, connected to the (two) line-side connections, for galvanically interrupting the low-voltage circuit, which is also connected to an electronic interruption unit that, due to semiconductor-based switching elements, has a high-resistance state of the switching elements for interrupting and a low-resistance state of the switching elements for allowing current to flow in the low-voltage circuit, wherein the electronic interruption unit is also connected to the (two) load-side connections,
- a voltage sensor, which is arranged between the mechanical isolating contact system and electronic interruption unit, for ascertaining the value of the voltage of the low-voltage circuit there,
- the mechanical isolating contact system is able to be actuated manually, such that contacts of the mechanical isolating contact system are able to be manually closed for a flow of current and opened for an interruption in the low-voltage circuit,
- a control unit that is connected to the voltage sensor and the electronic interruption unit.

According to the invention, the circuit breaker device is designed such that the value of the voltage is ascertained and, in the event of a voltage dip
- of 10 to 50 volts in the case of a mechanical isolating contact system with single-pole interruption (only one conductor, of the for example two conductors of the low-voltage circuit, is interrupted) or
- of 20 to 100 volts in the case of a mechanical isolating contact system with double-pole interruption (both conductors, of the for example two conductors of the low-voltage circuit, are interrupted), opening of the mechanical isolating contact system is identified.

Furthermore, in the event of a voltage dip to less than 10 volts, opening of the mechanical isolating contact system may likewise be identified.

According to the invention, this thus advantageously allows identification of opening (actuation) of the mechanical isolating contact system that is independent of said mechanical isolating contact system, that is to say its mechanical components, wherein only one voltage measurement in the low-voltage circuit is used. A very fast voltage measurement should advantageously be used.

Advantageous embodiments of the invention are given in the dependent claims.

In one advantageous embodiment of the invention, the (instantaneous) value of the voltage is compared with an (instantaneous) lower threshold value. The (instantaneous) lower threshold value is formed from the absolute value of an (instantaneous) expected value of the voltage multiplied by a scaling factor, which may in particular be a value in the range from 0.85 to 1, and minus a fixed voltage value, in particular a value in the range from 10 to 50 volts in the case of a mechanical isolating contact system with single-pole interruption or 20 to 100 volts in the case of a mechanical isolating contact system with double-pole interruption. If the instantaneous lower threshold value is fallen below, opening of the mechanical isolating contact system is identified.

This has the particular advantage of allowing a simple threshold value comparison solution for the invention. The scaling factor makes it possible to achieve a robust solution, in the case of a scaling factor of for example 0.85, which avoids incorrect identifications, or sensitive identification, in the case of a scaling factor of for example 1 (that is to say scaling is dispensed with).

In one advantageous embodiment of the invention, the (instantaneous) value of the voltage is compared with an (instantaneous) upper threshold value. The (instantaneous) upper threshold value is formed from the absolute value of an (instantaneous) expected value of the voltage divided by a scaling factor, in particular a value from the range 0.85 to 1, and added to a fixed voltage value, in particular a value from the range of 10 to 100 volts, in particular independently of the number of poles of the mechanical isolating contact system.

If the instantaneous upper threshold value is exceeded, opening of the mechanical isolating contact system (MK) is identified.

This has the particular advantage of allowing a further simple threshold value comparison solution for the invention.

Switching-induced voltage increases are also identified upon openings or as openings, these possibly arising for example due to inductances on the load side.

This also allows further protection or a further protective function against overvoltages.

This also allows a range check or allows a corridor check (lower and upper threshold value), wherein openings are able to be identified reliably.

The scaling factor makes it possible to achieve a robust solution, in the case of a scaling factor of for example 0.85, which avoids incorrect identifications, or sensitive identification, in the case of a scaling factor of for example 1 (that is to say scaling is dispensed with).

In one advantageous embodiment of the invention, upon identification of the opening (actuation) of the mechanical isolating contact system, the semiconductor-based switching elements of the electronic interruption unit change, in particular within a first time interval or less than a first time interval, which is in particular less than 100 µs, more specifically less than 50 µs or 10 µs, to a high-resistance state in order to avoid contact erosion caused by the switching arc or reduce the time of the switching arc duration of the mechanical isolating contact system.

This has the particular advantage that the mechanical contacts are able to be switched or opened in an almost power-free manner and contact erosion, which ages and damages the device, is reduced, since, following identification of the voltage dip caused by the switching arc, (virtually) immediate high resistance is brought about by the electronic interruption unit, as a result of which the further flow of current is immediately reduced and thus virtually immediately reduced. This furthermore advantageously makes it possible to dispense with an arc extinguishing system. The contact system may furthermore advantageously have a simpler design, since it is not necessary to provide as much material for contact erosion or it is not necessary to use any special alloys for the contact material.

In one advantageous embodiment of the invention, the circuit breaker device has a communication unit. Upon identification of the opening of the mechanical isolating contact system, information is output by the communication unit.

This has the particular advantage that switching off of the circuit breaker device is identified and communicated, for example to superordinate units or management systems.

In one advantageous embodiment of the invention, the circuit breaker device has a display unit. Upon identification of the opening of the mechanical isolating contact system, information is displayed by the display unit.

This has the particular advantage that the opening of the mechanical isolating contact system is displayed.

In one advantageous embodiment of the invention, the circuit breaker device has a memory. Upon identification of the opening of the mechanical isolating contact system, information is stored in the memory.

This has the particular advantage that information regarding the opening of the mechanical isolating contact system is able to be retrieved afterwards.

In one advantageous embodiment of the invention, provision is made for a further voltage sensor between the line-side connection and mechanical isolating contact system.

This has the particular advantage of allowing an alternative possibility for identifying opening of the mechanical isolating contact system and for further options.

In one advantageous embodiment of the invention, the further voltage sensor ascertains a voltage only to the extent as to whether a voltage is present at the line-side connections. In particular as to whether a valid line voltage (for example 230 V+/−10%) is present.

This has the particular advantage that it is possible to use a simplified voltage sensor. It is thereby furthermore possible to verify or distinguish whether the line-side energy source has been switched off or a mechanical actuation procedure/opening is present.

In one advantageous embodiment of the invention, the further voltage sensor ascertains the value of the voltage there. The voltage drop is ascertained by calculating a difference between the voltages of the two voltage sensors.

This has the particular advantage of allowing an alternative possibility for identifying opening of the mechanical isolating contact system.

In one advantageous embodiment of the invention, the further voltage sensor is galvanically isolated from the other units of the circuit breaker device. Provision may in particular be made for at least one optocoupler or capacitive elements.

This has the particular advantage of avoiding bypassing the isolating function or isolating properties of the mechanical isolating contact system.

In one advantageous embodiment of the invention, the circuit breaker device has an energy supply (such as a power supply unit) with an energy store. The energy supply with an energy store is designed such that, following an opening procedure of the contacts of the mechanical isolating contact system, enough energy is provided for:
- changing the semiconductor-based switching elements to the high-resistance state or (/and)
- outputting the information by way of the communication unit or (/and)
- displaying the information by way of the display unit or (/and)
- changing the circuit breaker device to a defined state, including storing information, in particular about the time of actuation or/and value of the voltage or/and current or/and frequency or/and temperature.

This has the particular advantage that the functions according to the invention are still able to be provided even following failure of the energy supply.

In one advantageous embodiment of the invention, an energy supply provided by the energy store is available for a time of 10 ms to 1 s, in particular 20 ms to 100 ms or 500 ms, following an opening procedure of the contacts of the mechanical isolating contact system.

This has the particular advantage that the circuit breaker device, in particular the control unit, following the opening procedure, in which the regular energy supply is likewise deactivated, is able to transition to a defined state, is able to store information and is able to transmit information, in particular about the opening of the contacts or/and the deactivation of the circuit breaker device. The control unit, in particular its microprocessor, may thus definitively shut down or definitively finish the switching-off procedure.

According to the invention, a corresponding method for a circuit breaker device for a low-voltage circuit having electronic (semiconductor-based) switching elements, having the same and further advantages, is claimed.

All embodiments, both in dependent form referring back to the independent patent claims and referring back only to individual features or combinations of features of patent claims, bring about an improvement in a circuit breaker device for the fast and reliable identification of an opening procedure of the mechanical isolating contact system/reduction of contact erosion/switching arcs.

The described properties, features and advantages of this invention and the way in which they are achieved will become clearer and more clearly comprehensible in connection with the following description of the exemplary embodiments, which are explained in more detail in connection with the drawing.

DETAILED DESCRIPTION OF THE INVENTION

Figure 1:
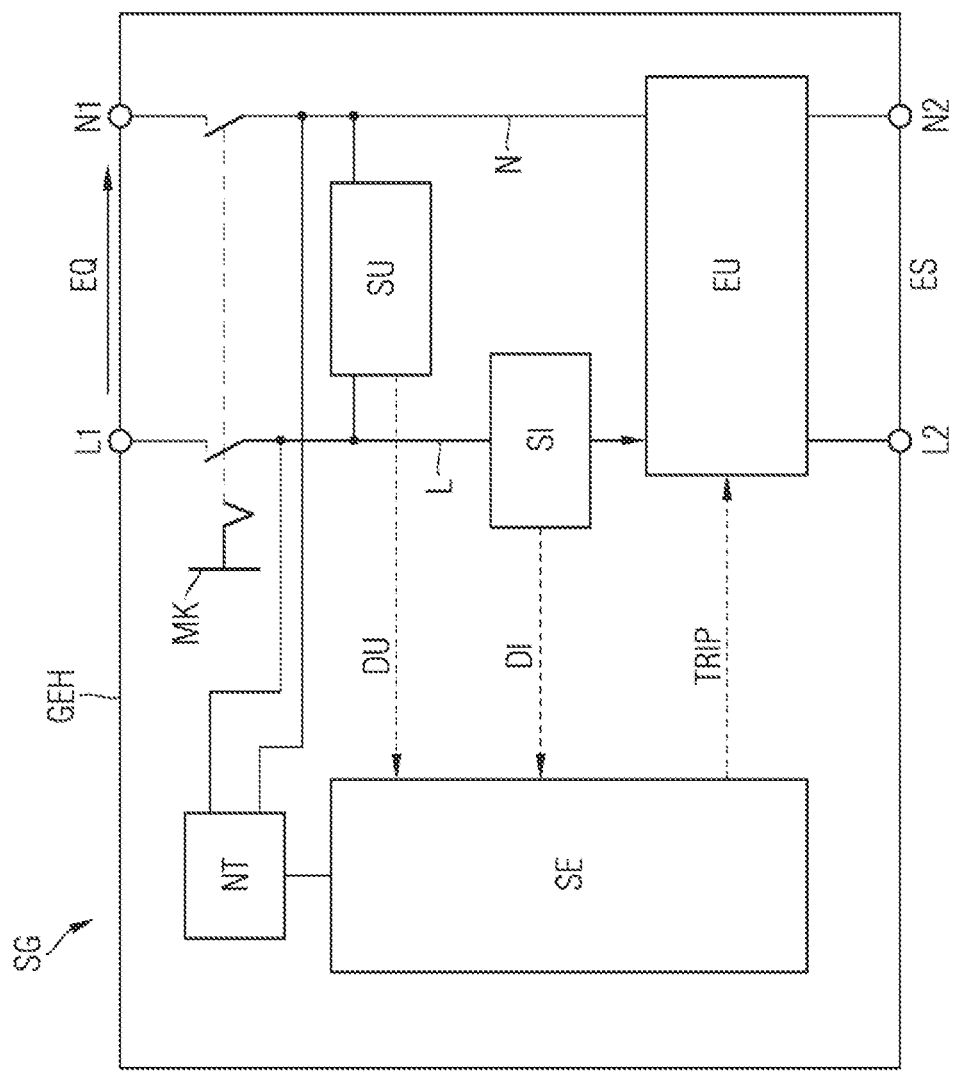
FIG. 1 shows an illustration of a circuit breaker device.

FIG. 1 shows an illustration of a circuit breaker device SG for protecting an electrical low-voltage circuit having a housing GEH, having:
- connections for conductors (L, N) of the low-voltage circuit, in particular first connections L1, N1 for a line-side, in particular energy source-side, connection EQ of the circuit breaker device SG and second connections L2, N2 for a load-side, in particular energy consumer-side—in the case of passive loads, connection ES (consumer-side connection) of the circuit breaker device SG, wherein specifically phase conductor-side connections L1, L2 and neutral conductor-side connections N1, N2 may be provided;

the load-side connection may have a passive load (consumer) or/and an active load ((further) energy source), or a load that may be both passive and active, for example in a time sequence;

the circuit breaker device has a two-pole design in this example: the first pole for a phase conductor L1, L2, the second pole for a neutral conductor N1, N2 of the low-voltage (AC) circuit;

a mechanical isolating contact system MK, connected to the line-side connections L1, N1, for galvanically interrupting the low-voltage circuit, which is also connected to an electronic interruption unit EU that, due to semiconductor-based switching elements, has a high-resistance state of the switching elements for interrupting and a low-resistance state of the switching elements for allowing current to flow in the low-voltage circuit, wherein the electronic interruption unit EU is also connected to the load-side connections L2, N2, the mechanical isolating contact system MK and the electronic interruption unit EU are electrically connected in series, the mechanical isolating contact system MK is able to be actuated, in particular exclusively, manually, such that contacts of the mechanical isolating contact system MK are able to be manually closed for a flow of current and opened for an interruption in the low-voltage circuit, for example, a handle may be installed on the circuit breaker device for opening and closing the contacts, and provision may furthermore be made for a switching support mechanism between handle and contacts, a voltage sensor SU, which is arranged between the mechanical isolating contact system MK and electronic interruption unit EU, for ascertaining the value of the voltage of the low-voltage circuit there, in particular for (periodically) ascertaining the value of the voltage of the low-voltage circuit, such that cyclic/instantaneous voltage values are present, a control unit SE, which is connected to the voltage sensor SU and the electronic interruption unit EU.

The circuit breaker device SG is designed such that the value of the voltage is ascertained and, in the event of a voltage dip of 10 to 50 volts in the case of a mechanical isolating contact system with single-pole interruption or of 20 to 100 volts in the case of a mechanical isolating contact system with double-pole interruption, opening or actuation of the mechanical isolating contact system is identified. As an alternative or in addition, in the event of a voltage drop to less than 10 volts.

Upon such identification of the opening or actuation of the mechanical isolating contact system, the semiconductor-based switching elements of the electronic interruption unit may for example change to a high-resistance state in order to avoid contact erosion, caused by switching arcs, of the contacts of the mechanical isolating contact system.

The circuit breaker device SG may have a communication unit. Upon identification of the opening or actuation of the mechanical isolating contact system, information may be output by the communication unit. The information may concern the actuation of the isolating contact, but also other information, for example an instantaneous value of the current or the voltage present at the time of the actuation, the time or the temperature.

The circuit breaker device may have a display unit. Upon identification of the opening or actuation of the mechanical isolating contact system, information is displayed by the display unit.

The circuit breaker device may have a memory. Upon identification of the opening or actuation of the mechanical isolating contact system, information (for example about the time of the identification, value of the voltage or/and current, frequency, temperature, etc.) is stored in the memory and may be read out later.

A further voltage sensor may be provided between the line-side connection (L1, N1) and mechanical isolating contact system MK. This may ascertain a voltage only to the extent as to whether a voltage is present at the line-side connections, in particular is present to a certain value. The further voltage sensor may ascertain the value of the voltage there. The voltage drop may be ascertained by calculating a difference between the voltages of the two voltage sensors.

The further voltage sensor may be galvanically isolated from the other units of the circuit breaker device SG, in particular by at least one optocoupler or capacitive elements in order to avoid bypassing of the mechanical isolating contact that is present.

The circuit breaker device has an energy supply with an energy store, for example a power supply unit NT having a capacitive energy store (one or more capacitors). The power supply unit NT is connected on the one hand to the conductors of the low-voltage circuit, preferably to the conductors between the mechanical isolating contact system MK and electronic interruption unit EU. The power supply unit NT on the other hand serves to supply energy to the control unit SE or/and the electronic interruption unit EU and possibly the voltage sensor SU or/and current sensor SI. The energy supply with an energy store is designed such that, following an opening procedure of the contacts of the mechanical isolating contact system MK, enough energy is provided for:

changing the semiconductor-based switching elements to the high-resistance state or (/and)

outputting information by way of the communication unit or (/and)

displaying the information by way of the display unit or (/and)

changing the circuit breaker device to a defined state (preparing the control unit for shutdown), including storing information, for example about the time of actuation, value of the voltage or/and current, frequency, temperature, etc.

Generally speaking, dimensioning may be performed such that an energy supply provided by the energy store is available for a time of 1 ms to 1 s, in particular 20 ms to 100 ms or 500 ms, following an opening procedure of the contacts of the mechanical isolating contact system.

In addition, for one embodiment of the invention, provision may furthermore be made for a current sensor SI for (periodically) ascertaining the value of the current of the low-voltage circuit or/and the change in the current over time, such that (cyclic) current values or/and current change values are present, as illustrated in the example according to FIG. 1.

The current sensor SI is then connected to the control unit SE. Current change values may be ascertained for example in the current sensor SI itself or in the control unit SE.

The electronic interruption unit EU is illustrated, according to FIG. 1, as a block in both conductors. In a first variant, this is understood to mean no interruption of both conductors. At least one conductor, in particular the active conductor, respectively phase conductor, has semiconductor-based switching elements. The neutral conductor may be free from switching elements, that is to say without semiconductor-based switching elements. In other words, the neutral conductor is connected directly, that is to say does not become highly resistive. In other words, only single-pole interruption (of the phase conductor) takes place. If further active conductors/phase conductors are provided, in a second variant of the electronic interruption unit EU, the phase conductors have semiconductor-based switching elements. The neutral conductor is connected directly, that is to say does not become highly resistive. By way of example, for a three-phase AC circuit.

In a third variant of the electronic interruption unit EU, the neutral conductor may likewise have a semiconductor-based switching element, in other words both conductors become highly resistive in the event of an interruption of the electronic interruption unit EU.

The electronic interruption unit EU may have semiconductor components such as bipolar transistors, field-effect transistors, insulated-gate bipolar transistors (IGBTs), metal-oxide-semiconductor field-effect transistors (MOSFETs) or other (self-controlled) power semiconductors. IGBTs and MOSFETs are particularly suitable for the circuit breaker device according to the invention due to low forward resistances, high blocking layer resistances and a good switching behavior.

The mechanical isolating contact system MK may have single-pole interruption in a first variant. In other words, only one conductor of the two conductors, in particular the active conductor, respectively phase conductor, is interrupted, that is to say has a mechanical contact. The neutral conductor is then free from contacts, that is to say the neutral conductor is connected directly.

If further active conductors/phase conductors are provided, in a second variant, the phase conductors have mechanical contacts of the mechanical isolating contact system. The neutral conductor is connected directly in this second variant. By way of example, for a three-phase AC circuit.

In a third variant of the mechanical isolating contact system MK, the neutral conductor likewise has mechanical contacts, as illustrated in FIG. 1. For example, for double-pole or all-pole interruption.

In the case of a three-phase AC circuit, the voltage dip is ascertained in the same way, wherein in this case measurements may be taken between two active conductors (phase conductors) or between active and neutral conductor.

The invention relates to identification of manual actuation, specifically opening, of the contacts of the mechanical isolating contact system. The identification takes place depending on the number of contacts that open. The identification of manual actuation is intended to take place, according to the invention, independently of the detection of mechanical actuation, that is to say purely electronically.

The circuit breaker device SG has a mechanical isolating contact system MK, in particular in accordance with standards with standard-compliant isolator properties, for galvanically isolating the circuit, in particular for the standard-compliant activation (in contrast to deactivation) of the circuit.

Mechanical isolating contact system MK denotes in particular a (standard-compliant) isolating function, performed by the isolating contact system MK. Isolating function denotes the points:

minimum clearance in air in accordance with standards (minimum distance between the contacts), displaying the contact position of the contacts of the mechanical isolating contact system, actuation of the mechanical isolating contact system possible at all times (no blocking of the isolating contact system).

With regard to the minimum clearance in air between the contacts of the isolating contact system, this is essentially voltage-dependent. Further parameters are the pollution degree, the type of field (homogeneous, inhomogeneous) and the air pressure or height above sea level.

There are corresponding specifications or standards for these minimum clearances in air or creepage distances. These specifications specify, for example in the case of air, for an impulse voltage withstand capability, the minimum clearance in air for an inhomogeneous and a homogeneous (ideal) electric field as a function of the pollution degree. Impulse voltage withstand capability is the ability to withstand the application of a corresponding impulse voltage. The isolating contact system or circuit breaker device has an isolating function (isolator property) only when this minimum length (minimum distance) is present.

In the context of the invention, the DIN EN 60947 or IEC 60947 series of standards are relevant here for the isolator function and its properties, which are incorporated here by reference.

The isolating contact system is advantageously characterized by a minimum clearance in air between the opened isolating contacts in the off position (open position, open contacts) as a function of the rated impulse withstand voltage and the pollution degree. The minimum clearance in air is in particular between (at least) 0.01 mm and 14 mm. The minimum clearance in air is in particular advantageously between 0.01 mm at 0.33 kV and 14 mm at 12 kV, in particular for pollution degree 1 and in particular for inhomogeneous fields.

The minimum clearance in air may advantageously have the following values:

E DIN EN 60947-1 (VDE 0660-100):2018-06

TABLE 13

| Rated impluse withstand voltage $U_{imp}$ | Minimum clearance in air |  |  |  |  |  |  |  |
|---|---|---|---|---|---|---|---|---|
| | Minimum clearances mm | | | | | | | |
| | Case A Inhomogeneous field conditions (see 2.5.63) | | | | Case B Homogeneous field ideal conditions (see 2.5.62) | | | |
| kV | 1 | 2 | 3 | 4 | 1 | 2 | 3 | 4 |
| 0.33 | 0.01 | 0.2 | 0.8 | 1.6 | 0.01 | 0.2 | 0.8 | 1.6 |
| 0.5 | 0.04 | | | | 0.04 | | | |

TABLE 13-continued

Minimum clearance in air

| Rated impulse withstand voltage $U_{imp}$ | Minimum clearances mm | | | | | | | |
|---|---|---|---|---|---|---|---|---|
| | Case A Inhomogeneous field conditions (see 2.5.63) | | | | Case B Homogeneous field ideal conditions (see 2.5.62) | | | |
| kV | 1 | 2 | 3 | 4 | 1 | 2 | 3 | 4 |
| 0.6 | 0.1 | | | | 0.1 | | | |
| 1.5 | 0.5 | 0.5 | | | 0.3 | 0.3 | | |
| 2.5 | 1.5 | 1.5 | 1.5 | | 0.6 | 0.6 | | |
| 4.0 | 3 | 3 | 3 | 3 | 1.2 | 1.2 | 1.2 | |
| 6.0 | 5.5 | 5.5 | 5.5 | 5.5 | 2 | 2 | 2 | 2 |
| 8.0 | 8 | 8 | 8 | 8 | 3 | 3 | 3 | 3 |
| 12 | 14 | 14 | 14 | 14 | 4.5 | 4.5 | 4.5 | 4.5 |

NOTE
The values of minimum clearances in air are based on 1.2/50 μs impulse voltage, for barometric pressure of 80 kPa, equivalent to normal atmospheric pressure at 2 000 m above sea level.

The pollution degrees and types of field correspond to those defined in the standards. This advantageously makes it possible to achieve a standard-compliant circuit breaker device dimensioned in accordance with the rated impulse withstand voltage.

The electronic identification of manual actuation, specifically opening, of the contacts of the mechanical isolating contact system, that is to say the identification of a voltage dip caused by the arc voltage of the switching contacts, may take place depending on the number of switching contacts, that is to say the number of poles, for example as follows.

In one variant, the circuit breaker device SG may be designed such that a differential voltage is ascertained from the ascertained voltage values and an expected value of the voltage, such that cyclic differential voltage values are present. Each differential voltage value is compared, in particular in terms of absolute value, with a first threshold value. If at least two successive differential voltage values are exceeded, an opening procedure of the mechanical isolating contact system is identified.

In order to avoid a further flow of current with switching arcs, the electronic interruption unit EU is activated, which changes to a high-resistance state in response.

The expected value of the voltage may for example be ascertained by what is known as a phase locked loop, PLL for short. A PLL is an electronic circuit arrangement that influences the phase angle and thus accordingly the frequency of a changeable oscillator via a closed-loop control circuit such that the phase difference between an external periodic reference signal and the oscillator or a signal derived therefrom is as constant as possible.

This makes it possible to ascertain inter alia the fundamental frequency and its amplitude of the supplied line voltage, that is to say the ascertained voltage values, that is to say the (interference-free or filtered) expected value of the (line) voltage.

The expected value of the voltage as output by the PLL may then be compared with the ascertained voltage value, in particular in a time-synchronous or phase-synchronous manner, such that there is a difference between the values. A PLL may often perform such a function itself, that is to say output the difference, that is to say a differential voltage value.

The differential voltage is then compared, in particular in terms of absolute value, with the threshold value.

As an alternative, the expected value of the voltage may also be stored in a table, wherein the respective voltage values are then compared in a phase-synchronous manner or a phase-synchronous difference is calculated, such that differential voltage values are present.

The differential voltage values may be ascertained for example in the voltage sensor SU itself or in the control unit SE, such that cyclic differential voltage values are present.

Figure 2:
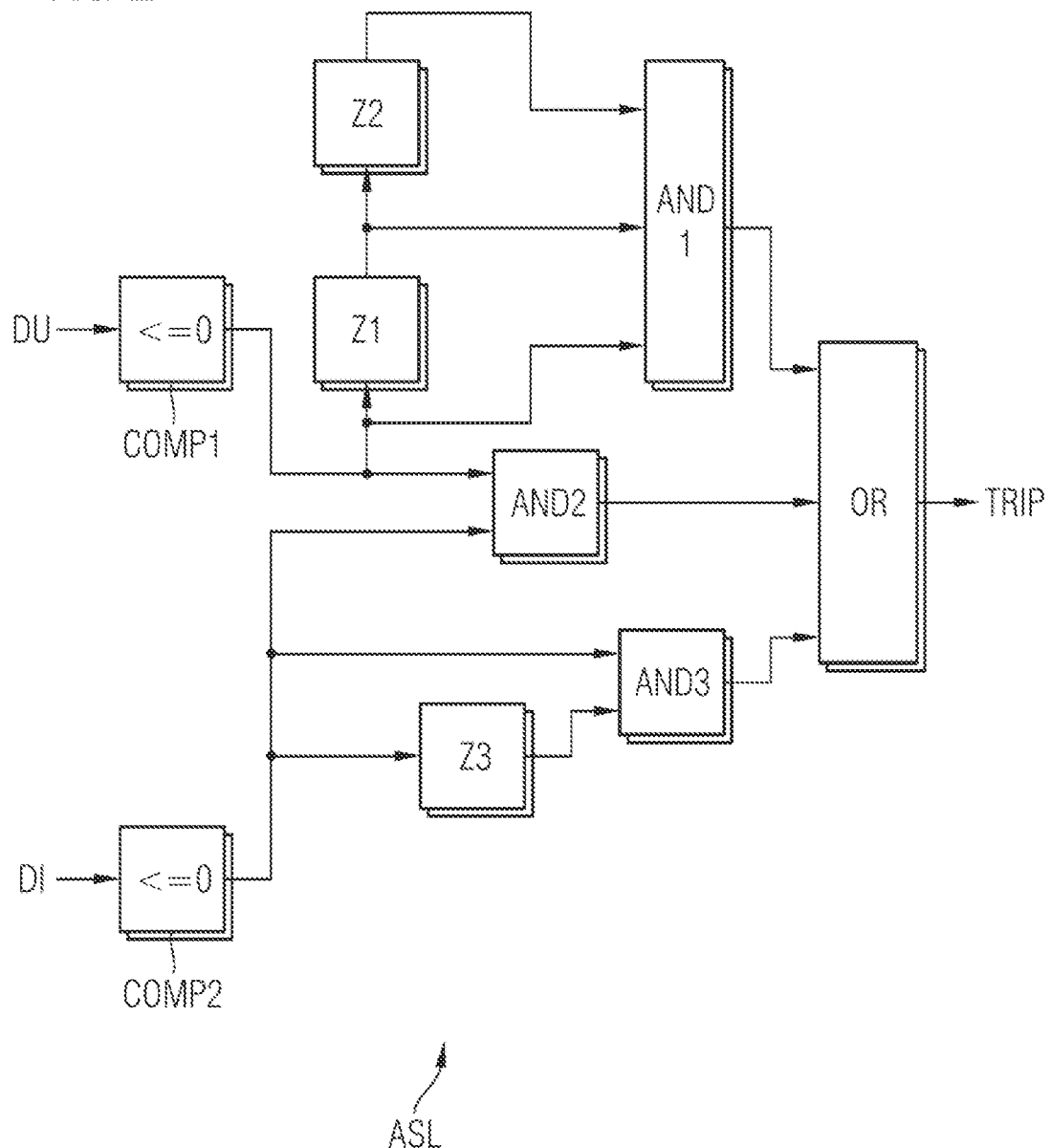
FIG. 2 shows a first embodiment of the circuit breaker device.

FIG. 2 shows an illustration of a deactivation logic unit ASL, as may be implemented for example in the control unit SE according to FIG. 1, for example functionally or in terms of circuitry. The differential voltage values are supplied (cyclically) to a first comparator COMP1 for comparing each differential voltage value DU with the first threshold value. The output of the first comparator COMP1 is furthermore connected:

firstly directly,
secondly via a first buffer memory Z1, which (cyclically) buffer-stores exactly one comparator output value,
in the embodiment according to FIG. 2, thirdly via the first buffer memory Z1 to a second buffer memory Z2, which (cyclically) buffer-stores exactly one comparator output value,
to a first And member AND1, such that, in the event of three successive differential voltage values being exceeded in the example, an interruption of the low-voltage circuit is initiated, for example by the interruption signal TRIP, which is transmitted from the control unit SE to the electronic interruption unit EU. In the same way, provision may be made for further buffer memories (exceeding four, five, etc. differential voltage values DU).

This arrangement makes it possible to ascertain the voltage dip of 10 to 50 volts in the case of single-pole interruption of the mechanical isolating contact system or of 20 to 100 volts in the case of double-pole interruption of the mechanical isolating contact system.

Further functions may be performed by the control unit SE or the deactivation logic unit ASL, as explained below.

FIG. 2 also shows an embodiment in which provision is made for a current ascertainment unit connected to the control unit, such that the change in the current over time of the low-voltage circuit is ascertained periodically, such that cyclic current change values are present. The change in the current over time may be ascertained for example in the current sensor SI itself or in the control unit SE. The current change values are supplied to a second comparator COMP2, which compares each current change value with a second threshold value. The output of the second comparator COMP2 is furthermore connected firstly directly and secondly via a third buffer memory Z3, which (cyclically) buffer-stores exactly one comparator output value, to a third And member AND3 such that, in the event of two successive current change values being exceeded, an interruption of the low-voltage circuit is initiated, for example by the interruption signal TRIP, which is transmitted from the control unit SE to the electronic interruption unit EU.

Generally speaking, provision may be made for further buffer memories (exceeding three, four, five, etc. current change values).

FIG. 2 also shows an embodiment in which the outputs of the comparators COMP1, COMP2 are logically linked by a second And member AND2, such that, in the event of the first and second threshold value being exceeded, ideally in the same cycle or the preceding/following or neighboring cycle, an interruption of the low-voltage circuit is initiated, for example by the interruption signal TRIP, which is transmitted from the control unit SE to the electronic interruption unit EU.

FIG. 2 also shows an embodiment in which the outputs of the first, second and third And member AND1, AND2, AND3 are combined via an Or member OR, such that
   in the event of at least two successive differential voltage values being exceeded or
   in the event of at least two successive current change values being exceeded or
   in the event of the first and second threshold value being exceeded within the first time window
   an interruption of the low-voltage circuit is initiated, for example by the interruption signal TRIP, which is in this case output by the Or member OR.

The differential voltage values or possibly current change values or the voltage values and possibly current values are (periodically) ascertained, for example in the voltage sensor SU or current sensor SI or in the control unit SE, at a cycle frequency that is greater than/equal to 10 kHz and less than/equal to 10 MHz, more specifically greater than/equal to 10 kHz and less than/equal to 1 MHz. Cyclic differential voltage values or possibly current change values or voltage values and possibly cyclic current values are thus present with a time difference of 100 µs to 0.1 µs, more specifically of 100 µs to 1 µs. The differential voltage values or possibly current change values of the same cycle, if values from the same cycle are present, may thus be compared with the threshold values. As an alternative, differential voltage value or possibly current change values of temporally corresponding cycles, if there is a time difference, cycle difference, between voltage values and current values. The time difference should not be greater than one cycle of the sampling. In other words, depending on the sampling rate, the first time window is exactly one cycle of the sampling rate long. In other words, for example, at a sampling rate of 100 kHz, the cycle is 10 µs, in other words the difference between two sample values is 10 µs, that is to say the first time window is then at most 10 µs.

According to the invention, in a circuit breaker device SG, only one voltage measurement may then be integrated in the device. For example, in the form of voltage sensors SU. The voltage sensor SU should preferably have a bandwidth that is greater than the cycle frequency. The same applies to the optional current sensor. The current sensor SI may for example have a measuring resistor, respectively shunt. The voltage sensor SU is used (solely) to identify manual switching procedures of the mechanical isolating contact system.

The measured value processing and the deactivation logic unit may be implemented for example: in the control unit SE, both using analog technology, in a computer, such as a microcontroller (µC) or a field-programmable gate array (FPGA) or partially using analog technology and partially in a computer.

In another variant for ascertaining the voltage dip, which is described below, the voltage sensor SU, in order to ascertain the value of the voltage of the low-voltage circuit, ascertains instantaneous voltage values DU (phase-related voltage values).

The circuit breaker device SG, in particular the control unit SE, is designed such that instantaneous (phase angle-related) threshold values are present. By way of example, in one simple case, the sinusoidal curve of the voltage, for example with 230 volts RMS, the amplitude of which is 325 volts, could be stored, per phase angle, with its expected instantaneous voltage value minus a reduction of for example 10% or a value between 10 and 30% or a fixed reduction of at least 10 volts, as instantaneous voltage value, wherein a value of at least 10 volts is used as minimum instantaneous threshold value (in order to avoid incorrect tripping). In the event of a reduction of for example 10%: 10 volts at 0° (minimum instantaneous threshold value), . . . , 146.25 volts (162.5 volts-10%) at 30°, . . . , 206.8 volts (229.8 volts-10%) at 45°, . . . , 253.3 volts (281.4 volts-10%) at 60°, 292.5 volts (325 volts-10%) at 90°, etc.

The instantaneous threshold values may in this case be present per individual phase angle, a phase angle range (multiple phase angles), for example every 2°, or a phase angle section (a portion of a phase angle), for example every 0.5°.

The instantaneous threshold values are accordingly adapted to an expected voltage dip for the manual actuation procedure.

The instantaneous voltage values DU are compared in terms of phase angle, preferably in terms of absolute value, with the instantaneous threshold values. In the event of the instantaneous threshold values being exceeded or fallen below, actuation is identified. If calculation of an absolute value is dispensed with, a check is made for the instantaneous threshold values being fallen below in the positive half-cycle, and a check is made for the instantaneous threshold values being exceeded in the negative half-cycle for identification purposes. As an alternative, the absolute values of the instantaneous voltage values DU may also be ascertained. The absolute values are then checked against falling below (the absolute values of) the instantaneous mathematical sign may advantageously be dispensed with. The comparison is made in relation to phase angles, that is to say the instantaneous voltage value of for example 30° phase angle of the voltage is checked against the instantaneous threshold value of 30° phase angle of the voltage.

As an alternative, an (instantaneous) differential voltage value may be formed (continuously) from the instantaneous threshold value (possibly its absolute value) and the instantaneous voltage value DU (possibly its absolute value). The (instantaneous) differential voltage value is compared with an (absolute or instantaneous) differential voltage threshold value and actuation is identified when it is exceeded (or fallen below—in the case of a comparison involving a mathematical sign).

As an alternative, a corridor check may likewise be performed, that is to say if the instantaneous voltage value differs by more than a particular percentage, in particular 5 to 15%, or a particular +/− voltage absolute value, in particular 10 to 40 volts, from the expected threshold value or expected voltage value, actuation is identified and advantageously (immediate) initiation of the (electronic) interruption of the low-voltage circuit takes place.

Actuation is identified for example using a (first) signal TRIP, which is transmitted from the control unit SE to the electronic interruption unit EU, as illustrated in FIG. 1.

The falling below or exceeding may advantageously be present for a first time interval, respectively for a phase angle range or phase angle section, in order to verify identification of the actuation.

Figure 3:
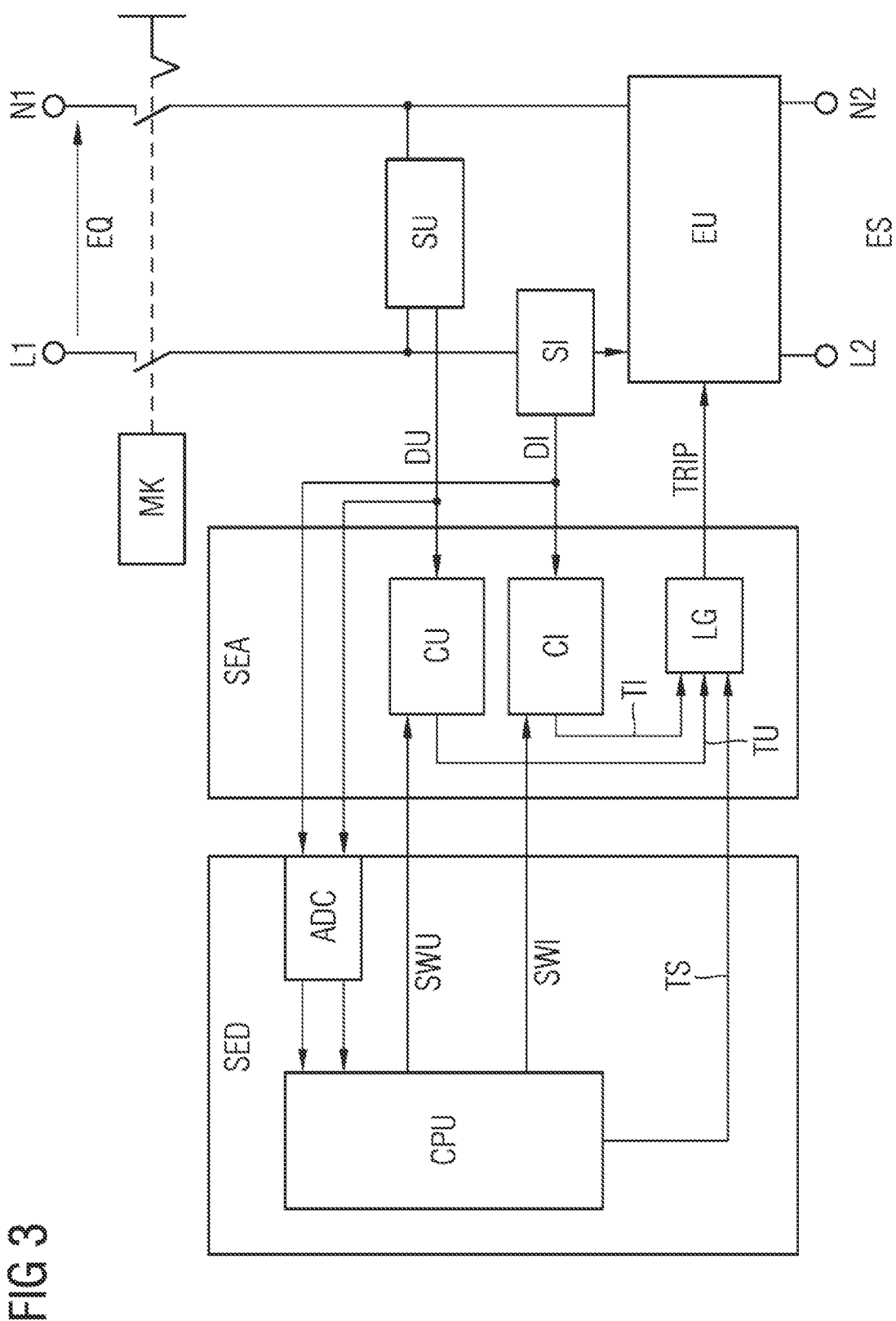
FIG. 3 shows a second embodiment of the circuit breaker device.

FIG. 3 shows an illustration according to FIG. 1, with a more detailed embodiment. In this case, the control unit SE has two subunits, a preferably analog first subunit SEA and a preferably digital second subunit SED. The first subunit SEA in this case has a voltage comparator CU. This is supplied, on the one hand, with the instantaneous voltage values DU, preferably in terms of absolute value, of the voltage sensor SU. On the other hand, the voltage comparator CU is supplied with the instantaneous threshold values SWU from the second subunit SED.

The voltage comparator CU compares the instantaneous voltage values DU with the instantaneous threshold values SWU and outputs, as described in the event of exceeding or falling below, a voltage interruption signal TU for identifying actuation and possibly initiating an interruption of the low-voltage circuit.

The voltage interruption signal TU may be supplied to a logic unit LG, which combines it with other interruption signals and outputs the (first) signal TRIP to the electronic interruption unit EU for the semiconductor-based interruption or high-resistance interruption.

In one embodiment, the voltage comparator CU bufferstores the instantaneous threshold values SWU in order to constantly have the values available.

The instantaneous voltage values DU are additionally supplied to the second subunit SED. In one preferred embodiment, the instantaneous voltage values DU are digitized there by an analog-to-digital converter ADC and supplied to a microprocessor CPU. This ascertains or calculates the instantaneous threshold values SWU. The instantaneous threshold values SWU ascertained by the second subunit SED or in particular the microprocessor CPU are in turn supplied to the first subunit SEA, in particular the voltage comparator CU, in order to perform the comparison described above.

In this case, the instantaneous threshold values SWU may advantageously be ascertained digitally in the second subunit SED or at a slower processing speed than the continuous comparison of voltage values and threshold values in the first subunit SEA.

In one advantageous embodiment, in which provision is made for a current sensor SI that outputs the value of the current, that is to say instantaneous current values DI, the first subunit SEA may have a current comparator CI. This is supplied on the one hand with the instantaneous current values DI of the current sensor SI. On the other hand, the current comparator CI is supplied with instantaneous current threshold values SWI from the second subunit SED. The current comparator CI compares the instantaneous current values DI with the instantaneous current threshold values SWI and outputs, in the same way as when the current is exceeded in initiate interruption of the low-voltage circuit.

The current interruption signal TI may be supplied to the logic unit LG, which combines it with other interruption signals and outputs the (first) signal TRIP to the electronic interruption unit EU for the semiconductor-based interruption or high-resistance interruption.

In one embodiment, the current comparator CI bufferstores the instantaneous current threshold values SWI in order to have the values constantly available.

The instantaneous current values DI may additionally be supplied to the second subunit SED. In one preferred embodiment, the instantaneous current values DI are digitized there by the analog-to-digital converter ADC and supplied to the microprocessor CPU. This ascertains or determines the instantaneous current threshold values SWI. The instantaneous current threshold values SWI ascertained by the second subunit SED or in particular the microprocessor CPU are in turn supplied to the first subunit SEA, in particular the current comparator CI, in order to perform the comparison described above.

In this case, the instantaneous current threshold values SWI may advantageously be ascertained digitally in the second subunit SED or at a slower processing speed than the continuous comparison of current values and threshold values in the first subunit SEA.

Figure 4:
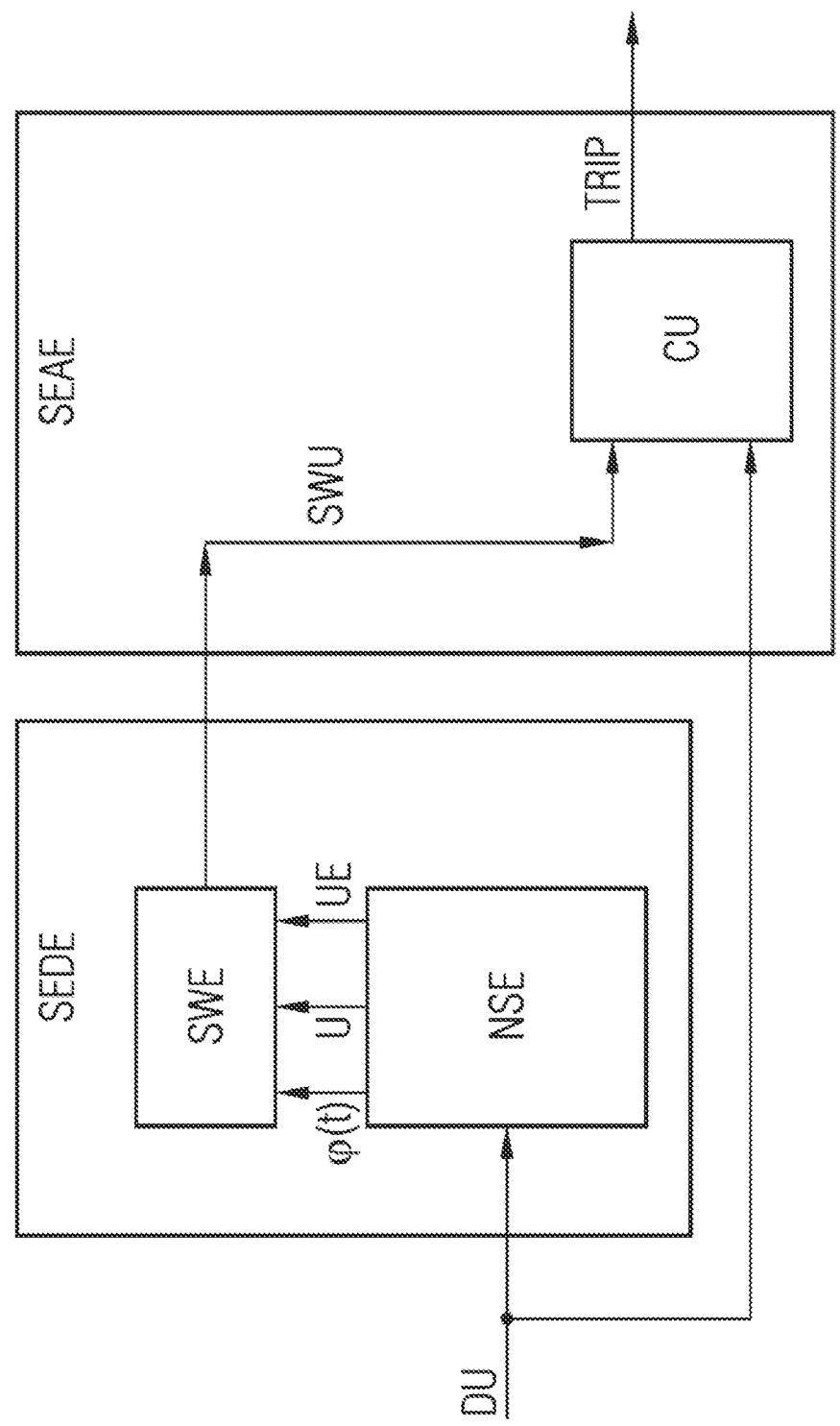
FIG. 4 shows a third embodiment of the circuit breaker device.

FIG. 4 shows a further embodiment or variant according to FIG. 1 and FIG. 3. FIG. 4 shows part of a simple variant of the first subunit SEAE and part of an alternative variant of the second subunit SEDE.

The part of the simple variant of the first subunit SEAE has the voltage comparator CU, to which the instantaneous voltage values DU, in particular their absolute value, and the instantaneous threshold values SWU, in particular likewise in terms of absolute value, are supplied. The voltage comparator CU in this example outputs the first signal TRIP for interrupting the low-voltage circuit directly, in the same way as FIG. 3. The absolute value may be calculated by one or further units, not illustrated.

The part of the alternative variant of the second subunit SEDE has a line synchronization unit NSE. This is supplied with the (analog) instantaneous voltage values DU. The line synchronization unit NSE, from the supplied (analog) instantaneous voltage values DU, which are a sinusoidal AC voltage of the low-voltage circuit, ascertains the amplitude U, the phase angle cp(t) and an expected temporal value of the voltage UE, respectively expected value of the voltage UE. The expected value of the voltage UE is a kind of filtered or regenerated or generated equivalent instantaneous voltage value DU.

The expected value of the voltage UE, just like the amplitude U and the phase angle cp(t), may be ascertained for example by what is known as a phase locked loop, PLL for short. A PLL is an electronic circuit arrangement that influences the phase angle and thus accordingly the frequency of a changeable oscillator via a closed-loop control circuit such that the phase difference between an external periodic reference signal (instantaneous voltage values) and the oscillator or a signal derived therefrom is as constant as possible.

This makes it possible to ascertain inter alia the fundamental frequency and its amplitude of the supplied line voltage, that is to say the ascertained voltage values, that is to say the (interference-free or filtered) expected value of the (line) voltage.

The amplitude U, phase angle cp(t) and expected temporal value of the voltage UE as ascertained by the line synchronization unit NSE are supplied to a threshold value unit SWE. The threshold value unit SWE modifies the expected value of the voltage UE to form an instantaneous threshold value SWU, wherein for example:

a fixed voltage absolute value may be subtracted from the expected value of the voltage UE, for example of the voltage dip to be tested, or a voltage absolute value dependent on the phase angle may be subtracted from the expected value of the voltage UE, for example in a manner proportional to the voltage dip to be tested, or a fixed percentage of the voltage may be subtracted from the expected value of the voltage UE, for example in a manner proportional to the voltage dip to be tested, or a phase angle-dependent percentage of the voltage may be subtracted from the expected value of the voltage UE, for example in a manner proportional to the voltage dip to be tested, in order to obtain the instantaneous threshold value SWU.

The instantaneous threshold value SWU may furthermore be adjusted by the amplitude U of the instantaneous voltage, that is to say that, at a high amplitude of the voltage, a high instantaneous threshold value is present and, at a low amplitude of the voltage, a low instantaneous threshold value is present, to reliably detect the voltage dip.

The instantaneous threshold values SWU may be conveyed, by the presence of the phase angle cp(t) in the threshold value unit SWE, from this, synchronously with the instantaneous voltage DU, to the comparator CU, such that a phase-related (phase angle-related) comparison is able to be performed between instantaneous threshold value and instantaneous voltage value in the voltage comparator CU.

Figure 5:
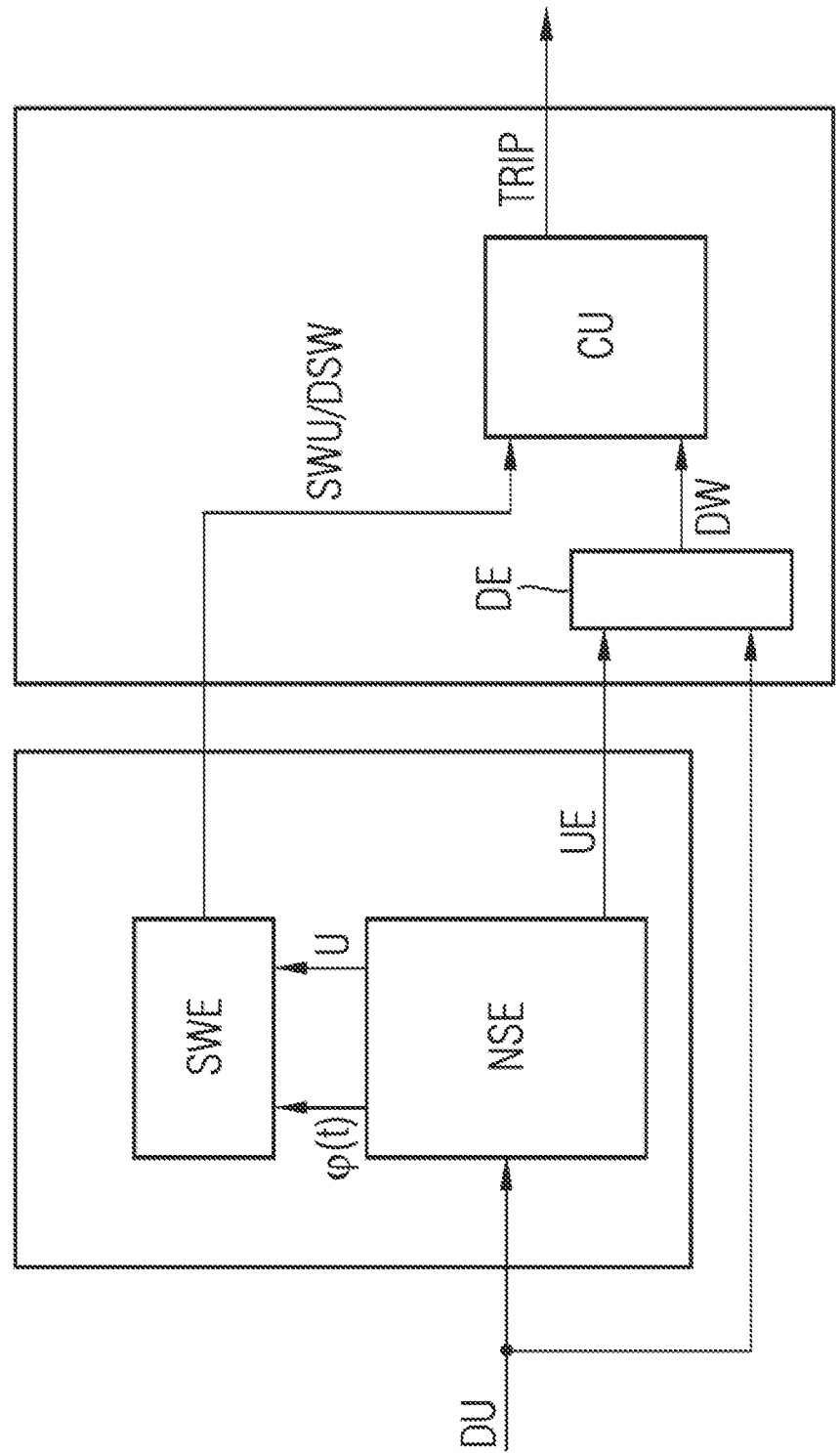
FIG. 5 shows a fourth embodiment of the circuit breaker device.

FIG. 5 shows an alternative embodiment according to FIG. 3 or 4, with the difference that the expected value of the voltage UE is supplied not to the threshold value unit SWE, but rather to a differential unit DE. The instantaneous voltage value DU is furthermore supplied not to the voltage comparator CU, but rather to the differential unit DE. The differential unit DE calculates a difference between the expected value of the voltage UE and instantaneous voltage value DU, this taking place in a phase angle-related or phase angle-accurate manner. This thus generates a (phase angle-dependent) differential voltage value DW, which is supplied to the voltage comparator CU. The voltage comparator CU is also supplied with the instantaneous threshold value SWU, which is provided by the threshold value unit SWE in this example, in a phase-related and amplitude-influenced manner, as a (phase-related) differential voltage value.

The expected value of the voltage UE as output by the line synchronization unit, in particular in the form of a PLL, is compared in this example with the instantaneous voltage value DU, in particular in a time-synchronous or phase-synchronous manner, such that there is a difference between the values DW. A PLL may often perform such a function itself, that is to say output the difference, that is to say a differential voltage value DW.

The differential voltage value DW is then compared, in particular in terms of absolute value, with the instantaneous threshold value SWU, in this case a differential voltage threshold value that corresponds to the voltage dip to be tested.

Alternative embodiments are also conceivable.

The temporal characteristic of the voltage is tested with regard to the voltage dip. A highly accurate identification may be achieved through phase-accurate comparison with the expected voltage.

The phase angle resolution determines the speed of the calculation of the threshold values. In the case of a phase angle resolution of 1°, in other words, a threshold value is present for each full phase angle of the voltage, that is to say an instantaneous threshold value is present roughly every 55.5 µs. The deactivation is preferably achieved using an analog comparator, that is to say continuously, and is thus much faster than the phase angle resolution.

As an alternative, the following temporal characteristic applies in the case of fully digital processing. The phase angle resolution determines the speed of the identification. In the case of a phase angle resolution of 1°, in other words a threshold value is present for each full phase angle of the voltage, that is to say an instantaneous threshold value is present roughly every 55.5 µs, this means that deactivation may take place after a minimum of around 60 µs. Shorter deactivation times may be achieved at higher phase angle resolutions.

In this example, the values are then processed at at least 18 kHz.

As an alternative, the expected value of the voltage may be stored in a table, wherein the respective voltage values are then compared in a phase-synchronous manner or a phase-synchronous difference is calculated, such that differential voltage values are present.

Figure 6:
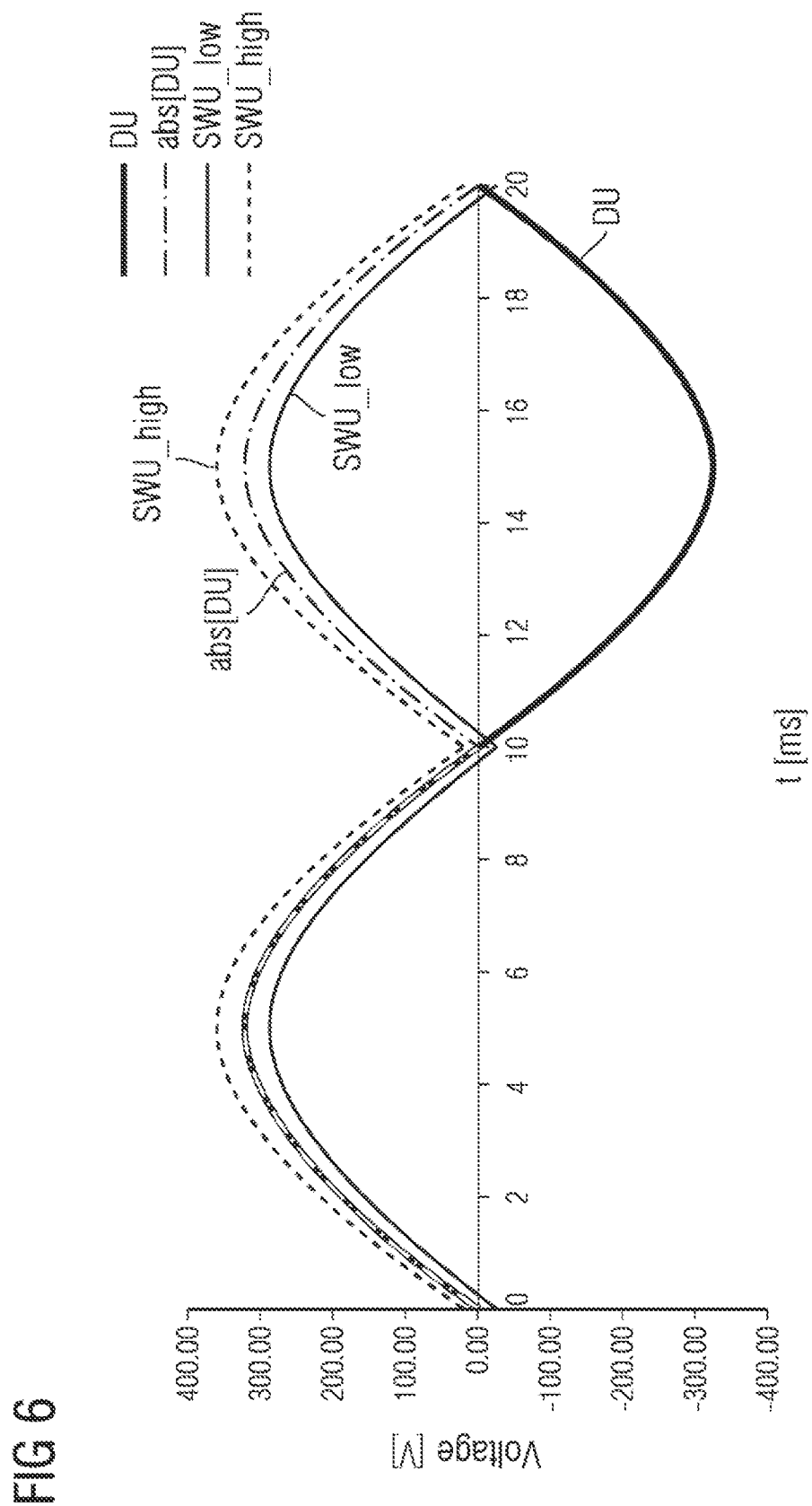
FIG. 6 shows a first voltage and threshold value characteristic over time.

FIG. 6 shows a graph with voltage [V] in volts, on the left-hand vertical axis, and time t [ms] in milliseconds, on the horizontal axis. A period of a sinusoidal AC voltage (the line voltage) is illustrated, in the example the value of the voltage DU of the low-voltage AC circuit for a period duration, in this case 20 ms (f=50 Hz). The absolute value of the sinusoidal AC voltage abs(DU) over time t [ms] is also illustrated.

The characteristic of a first (voltage) threshold value SWU, specifically of a lower threshold value SWU_low for a period duration of the voltage over time, is also illustrated.

The characteristic of a second (voltage) threshold value SWU, specifically of an upper threshold value SWU_high for a period duration of the voltage over time, is also illustrated.

Lower and upper threshold value SWU_low, SWU_high may form a threshold value corridor (corridor), as illustrated in FIG. 6.

In one advantageous embodiment, the absolute value of the expected value of the voltage is used to calculate the lower (voltage) threshold value characteristic SWU_low. The threshold value characteristic SWU_low over time, that is to say of the instantaneous lower threshold values, is calculated in this case from the (instantaneous) expected value of the absolute value of the voltage, in the simplest case of the instantaneous line voltage value, multiplied by a scaling factor, in particular a value from the range 0.85 to 0.99 or 1; and a subtraction of a fixed voltage value, in particular a value from the range 10 to 40 or 50 volts.

In one advantageous embodiment, the absolute value of the upper (voltage) threshold value SWU_high is calculated in the same way. The (instantaneous) upper threshold value SWU_high is calculated in this case from the (instantaneous) absolute value of the expected value of the voltage (line voltage characteristic), divided by a scaling factor, in particular a value from the range 0.85 to 0.99 or 1; and an addition of a fixed voltage value, in particular a value from 10 to 100 volts, in particular independently of the number of poles (number of poles or contacts/interrupting conductors) of the mechanical isolating contact system MK.

The lower and the upper (voltage) threshold value characteristic together form a corridor. If the value of the (instantaneously) measured/ascertained voltage leaves this corridor, opening (actuation) of the mechanical isolating contact system is identified.

Figure 7:
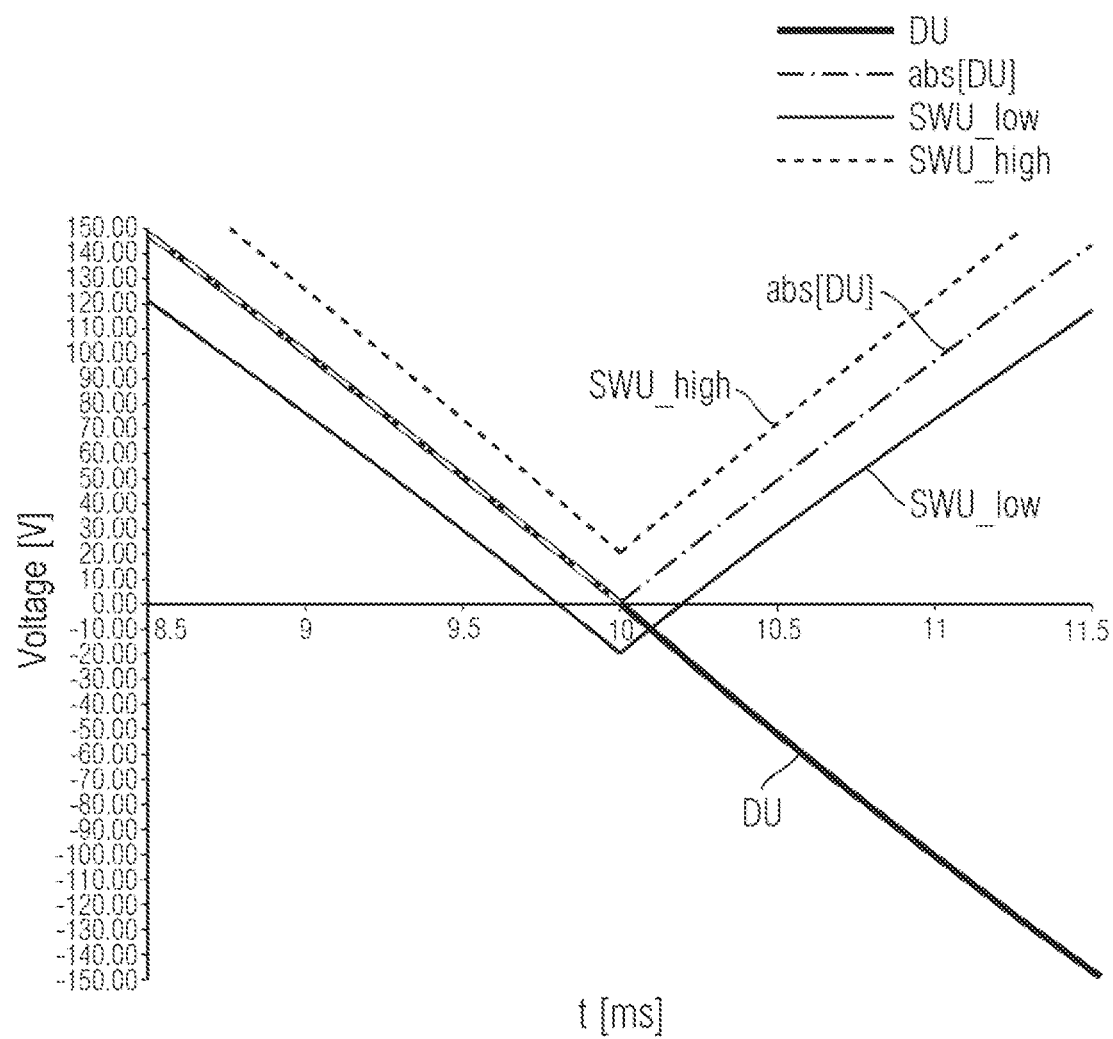
FIG. 7 shows a second voltage and threshold value characteristic over time.

FIG. 7 shows an illustration according to FIG. 6 with the difference that the temporal characteristic of the (voltage)

threshold values SWU_low, SWU_high are illustrated in detail for the voltage zero crossing, in this case at t=10 ms. In addition to the illustration of the temporal characteristic of the voltage DU, its absolute value abs(DU) is also illustrated, as in FIG. 6.

In order to avoid incorrect tripping, a minimum difference from the ascertained value of the voltage is required. For this purpose, in one advantageous embodiment of the invention, in particular for small instantaneous voltages (<20 V, <30 V, <40 V), close to the zero crossing, the instantaneous lower threshold value or the lower voltage threshold value curve SWU_low should never run below the zero line, as illustrated in FIG. 7. A voltage dip would not be identified in this case, but this does not represent a disadvantage for the solution.

Although the invention has been described and illustrated in more detail by the exemplary embodiment, the invention is not restricted by the disclosed examples and other variations may be derived therefrom by a person skilled in the art without departing from the scope of protection of the invention.

The invention claimed is:

1. A circuit breaker for protecting an electrical low-voltage circuit, the circuit breaker comprising:
   a housing having line-side connections and load-side connections for conductors of the electrical low-voltage AC circuit;
   an electronic interruption unit having semiconductor-based switching elements;
   a mechanical isolating contact system, connected to said line-side connections, for galvanically interrupting the electrically low-voltage circuit, and is further connected to said electronic interruption unit that, due to said semiconductor-based switching elements, has a high-resistance state of said semiconductor-based switching elements for interrupting and a low-resistance state of said semiconductor-based switching elements for allowing current to flow in the electrical low-voltage circuit;
   said electronic interruption unit is further connected to said load-side connections;
   a voltage sensor, disposed between said mechanical isolating contact system and said electronic interruption unit, for ascertaining a value of a voltage of the electrical low-voltage circuit there;
   said mechanical isolating contact system being actuated manually, such that contacts of said mechanical isolating contact system are able to be manually closed for a flow of the current and opened for an interruption in the electrical low-voltage circuit;
   a controller connected to said voltage sensor and said electronic interruption unit;
   the circuit breaker being configured that the value of the voltage is ascertained and, in an event of a voltage dip of:
      10 to 50 volts in a case of said mechanical isolating contact system having with single-pole interruption; or
      20 to 100 volts in a case of said mechanical isolating contact system with double-pole interruption; or
      less than 10 volts;
   an opening of said mechanical isolating contact system is identified.

2. The circuit breaker according to claim 1, wherein:
   the value of the voltage is compared with an instantaneous lower threshold value;
   the instantaneous lower threshold value is formed from an absolute value of an instantaneous expected value of the voltage multiplied by a scaling factor and minus a fixed voltage value; and
   if the value of the voltage is below the instantaneous lower threshold value, an opening of said mechanical isolating contact system is identified.

3. The circuit breaker according to claim 2, wherein:
   the scaling factor is 0.85 to 1; and
   the fixed voltage value is:
      10 to 50 volts in a case of said mechanical isolating contact system with single-pole interruption; or
      20 to 100 volts in a case of said mechanical isolating contact system with double-pole interruption.

4. The circuit breaker according to claim 1, wherein:
   the value of the voltage is compared with an instantaneous upper threshold value;
   the instantaneous upper threshold value is formed from the absolute value of an instantaneous expected value of the voltage divided by a scaling factor and added to a fixed voltage value; and
   if the instantaneous upper threshold value is exceeded, opening of said mechanical isolating contact system is identified.

5. The circuit breaker according to claim 4, wherein:
   the scaling factor is 0.85 to 1; and
   the fixed voltage value is 10 to 100 volts independently of a number of poles of said mechanical isolating contact system.

6. The circuit breaker according to claim 1, wherein in that, upon identification of the opening of said mechanical isolating contact system, said semiconductor-based switching elements of said electronic interruption unit change within a first-time interval to the high-resistance state in order to avoid contact erosion caused by a switching arc or reduce a time of a switching arc duration of said mechanical isolating contact system.

7. The circuit breaker according to claim 6, wherein the first-time interval is less than 100 µs.

8. The circuit breaker according to claim 1, further comprising a communication unit, and in that, upon identification of the opening of said mechanical isolating contact system, at least one item of information is output by said communication unit.

9. The circuit breaker according to claim 8, further comprising a display, and in that, upon identification of the opening of said mechanical isolating contact system, information is displayed by said display.

10. The circuit breaker according to claim 9, further comprising an energy supply with an energy store, said energy supply is configured such that, following an opening procedure of said contacts of said mechanical isolating contact system, enough energy is provided for:
    changing said semiconductor-based switching elements to the high-resistance state; or
    outputting the information by way of said communication unit; or
    displaying the information by way of said display; or
    changing the circuit breaker to a defined state, including storing the information.

11. The circuit breaker according to claim 10, wherein the energy supply provided by said energy store is available for a time of 1 ms to 1 s following an opening procedure of said contacts of said mechanical isolating contact system.

12. The circuit breaker according to claim 1, further comprising a memory, and in that, upon identification of the opening of said mechanical isolating contact system, information is stored in said memory.

13. The circuit breaker according to claim 1, further comprising a further voltage sensor disposed between said line-side connections and said mechanical isolating contact system.

14. The circuit breaker according to claim 13, wherein said further voltage sensor ascertains a voltage only to an extent as to whether a voltage is present at said line-side connections.

15. The circuit breaker according to claim 14, wherein said further voltage sensor ascertains the voltage only to an extent as to whether a valid line voltage is present at said line-side connections.

16. The circuit breaker according to claim 13, wherein said further voltage sensor ascertains a value of a voltage there, and in that a voltage drop is ascertained by calculating a difference between voltages of said voltage sensor and said further voltage sensor.

17. The circuit breaker according to claim 13, wherein said further voltage sensor is galvanically isolated from other components of the circuit breaker.

18. A method for a circuit breaker having line-side connections and load-side connections for conductors of a low-voltage AC circuit, a mechanical isolating contact system, connected to the line-side connections, for galvanically interrupting the low-voltage AC circuit, which is further connected to an electronic interruption unit that, due to semiconductor-based switching elements, has a high-resistance state of the semiconductor-based switching elements for interrupting and a low-resistance state of the semiconductor-based switching elements for allowing current to flow in the low-voltage AC circuit, wherein the electronic interruption unit is also connected to the load-side connections, wherein the mechanical isolating contact system is able to be actuated manually, such that contacts of the mechanical isolating contact system are able to be manually closed for a flow of current and opened for an interruption in the low-voltage AC circuit, which comprises the steps of:
  measuring a value of a voltage between the conductors between the mechanical isolating contact system and the electronic interruption unit; and
  identifying an opening of the mechanical isolating contact system in an event of a voltage dip of 10 to 50 volts in a case of the mechanical isolating contact system with single-pole interruption or of 20 to 100 volts in a case of the mechanical isolating contact system with double-pole interruption.

19. The method according to claim 18, which further comprises:
  comparing the value of the voltage with an instantaneous lower threshold value, wherein the instantaneous lower threshold value is formed from an absolute value of an instantaneous expected value of the voltage multiplied by a scaling factor and minus a fixed voltage value; and
  identifying the opening of the mechanical isolating contact system if the value of the voltage falls below the instantaneous lower threshold value.

20. The method according to claim 18, which further comprises:
  comparing the value of the voltage with an instantaneous upper threshold value, wherein the instantaneous upper threshold value is formed from an absolute value of an instantaneous expected value of the voltage divided by a scaling factor and added to a fixed voltage value; and
  identifying an opening of the mechanical isolating contact system if the instantaneous upper threshold value is exceeded.

* * * * *